Patented May 14, 1946

2,400,436

UNITED STATES PATENT OFFICE 2,400,436

BIOTIN INTERMEDIATE

Wilbur I. Patterson, Fairfax, Va., and Joseph V. Karabinos, Columbus, Ohio, assignors, by mesne assignments, to Wyeth Incorporated, Philadelphia, Pa., a corporation of Delaware No Drawing. Application June 30, 1943, Serial No. 492,977

2 Claims. (Cl. 260—329)

This invention relates to the synthesis of a compound with the ring structure of biotin (vitamin H) and more particularly to an intermediate of such synthesis.

Several methods of approach to the synthesis of biotin have been used and in the present case the intermediate disclosed herein has been isolated as a step of the synthesis approach through dihydroxytetrahydrothiophene. In its broadest sense the invention consists in reacting a butane compound containing mercury with iodine in the presence of carbon tetrachloride and thereafter forming 3,4-dihydroxytetrahydrothiophene, this latter compound being an intermediate in the synthesis of biotin.

As an illustrative example of the preparation of this intermediate the following is given:

*Meso-1,4-diacetoxy mercuri 2,3-diethoxy butane.*—Forty grams (0.125 mole) of mercuric acetate and 225 cc. of absolute ethyl alcohol were placed in a 500 cc. filtering flask fitted with a large expansion bulb reaching nearly to the bottom of the flask. Gaseous butadiene (0.067 mole) from the sulfone, or from a measured quantity of liquid butadiene in a test-tube, was introduced through the side tube of the filtering flask. The reaction mixture was shaken to facilitate absorption of the gas. After the absorption started the flask was placed on a hot-plate and maintained just below the boiling point of the alcohol. The mercuration can be carried out with good results at room temperature but a longer time is required since the mercuric acetate dissolves quite slowly. When all of the butadiene had been absorbed a test portion of the solution was withdrawn and made alkaline with aqueous sodium hydroxide. If a yellow precipitate of mercuric oxide formed, a small additional quantity of butadiene was introduced and the absorption process continued until the sodium hydroxide test was negative.

The mercuration mixture was allowed to cool to 20° and the crystals of the less soluble product (alpha-isomer) were filtered with suction and washed twice with ether. The first crop of crystals weighed 20–23 g. The filtrate and washings were subjected to distillation on a steam-bath until most of the alcohol had been removed. The residue was filtered when cold and the filtrate was reserved for isolation of the more soluble product (beta-isomer). The second crop of crystals of the beta-isomer was washed with ether and combined with the first crop, giving a total of about 25 g. (60% yield, based on mercuric acetate) of the alpha-isomer. The product formed colorless crystals from ethyl alcohol; M. P. 162–163°.

*Meso-2,3-diethoxy-1,4-diiodobutane.*—A solution of 25 g. (0.15 mole) of potassium iodide in 50 cc. of water was added with stirring to a suspension of 50 g. (0.075 mole) of the meso diacetoxy-mercury compound (M. P. 162–163°) in 200 cc. of water.

After stirring for thirty minutes the precipitate of 2,3-diethoxy-1,4-diiodomercuributane was filtered with suction and allowed to dry in the air. The yield was practically quantitative.

The diiodomercury compound was refluxed with 200 cc. of carbon tetrachloride and 39 g. (0.153 mole) of iodine for two hours. Mercuric iodide appeared after the first few minutes of heating; the mixture was still colored due to excess iodine at the end of the heating period. The reaction mixture was filtered while hot and the residual mercuric iodide was washed with three portions of hot carbon tetrachloride. The filtrate and washings were evaporated until the solvent had been removed completely and then treated with hot water containing sodium bisulfite until the iodine color had disappeared. The product liquefied under hot water but crystallized on cooling. The crude material weighed 25–26 g. (85% yield). After three crystallizations from ethyl alcohol, and drying over calcium chloride, the product formed colorless crystals, M. P. 52–53°.

*3,4-diethoxytetrahydrothiophene.*—Forty-eight and one-half grams of 1,4-diiodo-2,3-diethoxybutane (V) (prepared by the method of John R. Johnson, William H. Jobling, George W. Bodamer JACS: 63: 131:1941) was refluxed with 250 cc. of 80% ethanol containing 50 grams of potassium sulfide. The alcohol was removed by distillation and after the addition of 100 cc. of water the residue was steam distilled. The distillate (500 cc.) was extracted twice with ethyl acetate (400 cc. total) and the solvent evaporated in vacuo. The residue was distilled in vacuo using an aspirator and 12 g. of product boiling at 115–117° was obtained. The yellow liquid had an odor resembling kerosene.

Anal. Calcd. for $C_8H_{16}O_2S$: C, 54.50; H, 9.15 Found: C, 53.6; H, 8.8.

The above liquid when treated with an aqueous solution of mercuric chloride gave a precipitate which was recrystallized several times from dilute alcohol and then melted at 142–4°.

*3,4-dihydroxytetrahydrothiophene.*—Two grams of the diethoxytetrahydrothiophene were refluxed for 2 hours with 20 cc. of constant boiling hydrobromic acid. The mixture was then concentrated in vacuo to a heavy sweet smelling syrup which was soluble in water and alcohol and insoluble in benzene. The crude product weighed 1.1 gram.

Anal. Calcd. for $C_4H_8O_2S$: C, 39.65; H, 6.66. Found: C, 41.21; H, 6.94.

The reaction is indicated by the following formula:

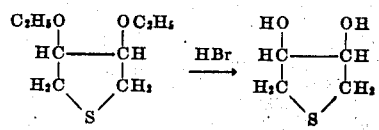

What we claim is:

1. 3,4-dihydroxytetrahydrothiophene.
2. The process of preparing 3,4-dihydroxytetrahydrothiophene which consists in preparing meso-1,4-diacetoxy mercuri 2,3-diethoxybutane, reacting said compound with an aqueous solution of potassium iodide to form 2,3-diethoxy-1,4-diiodomercuributane, reacting said diiodomercuributane compound with iodine to produce 2,3-diethoxy-1,4-diiodobutane, reacting said diiodobutane compound with potassium sulfide to form 3,4-diethoxytetrahydrothiophene and reacting said thiophene compound with hydrobromic acid to form 3,4-dihydroxytetrahydrothiophene.

WILBUR I. PATTERSON.
JOSEPH V. KARABINOS.